United States Patent [19]

Maeda et al.

[11] Patent Number: 5,317,549
[45] Date of Patent: May 31, 1994

[54] INFORMATION RECORDING AND REPRODUCING APPARATUS

[75] Inventors: Shigemi Maeda, Yamatokoriyama; Kunio Kojima, Nara, both of Japan

[73] Assignee: Sharp Kabushiki Kaisha, Osaka, Japan

[21] Appl. No.: 876,072

[22] Filed: Apr. 28, 1992

[30] Foreign Application Priority Data

Apr. 30, 1991 [JP] Japan .................. 3-098878

[51] Int. Cl.⁵ .............................................. G11B 7/00
[52] U.S. Cl. .................................... 369/32; 369/58
[58] Field of Search ......................... 369/13, 32, 58

[56] References Cited

U.S. PATENT DOCUMENTS

| | | | |
|---|---|---|---|
| 4,907,216 | 3/1990 | Rijnsburger | 369/275 |
| 5,107,481 | 4/1992 | Miki et al. | 369/58 X |
| 5,144,610 | 9/1992 | Horiguchi | 369/32 X |
| 5,153,861 | 10/1992 | Maeda et al. | 369/32 |

FOREIGN PATENT DOCUMENTS

| | | | |
|---|---|---|---|
| 55-089921 | 7/1980 | Japan | 369/58 |
| 61-134928 | 6/1986 | Japan | 369/58 |
| 62-184628 | 8/1987 | Japan | 369/58 |

*Primary Examiner*—Tony M. Argenbright

[57] ABSTRACT

An information recording and reproducing apparatus employs a magneto-optical disk including a main information recording area wherein plural pieces of main information can be recorded and a TOC area wherein control information related to each piece of main information can be recorded. When a reproducing operation cannot be performed from the TOC area, it is checked whether or not any pieces of control information exist, for example, by detecting an amplitude of a reproduced signal. Or, whether or not a recording or reproducing function of the apparatus works properly may be checked by, for example, a method of test writing and reproduction. As a result, whether or not the magneto-optical disk is a blank disk can be accurately determined. Further, when the disk is determined to be a blank disk, distinctive information indicating a blank disk is recorded in a predetermined portion of the TOC area. Thereafter, upon loading the disk, the disk is promptly determined to be a blank disk. On the other hand, when the disk is not determined to be a blank disk, at least a recording operation is inhibited, thereby eliminating a possibility of destroying useful main information already recorded in the main information recording area.

21 Claims, 12 Drawing Sheets

INFORMATION RECORDING AND REPRODUCING APPARATUS

FIELD OF THE INVENTION

The present invention relates to an information recording and reproducing apparatus for recording and reproducing information on and from a recording medium including a main information recording area wherein various kinds of information such as a digital audio signal or computer-use data can be recorded and a control information recording area wherein control information related to each piece of main information can be recorded.

BACKGROUND OF THE INVENTION

Conventionally, so-called compact disks (hereinafter referred to as CDs) have been widely used whereon successive information such as music information is recorded as digital signals in the form of optically detectable minute pits. Meanwhile, CD-ROMs (Compact Disc Read Only Memory), whereon discrete information such as computer-use data as well as music information is recorded, have been viewed with interest for its characteristics of large storage capacity and high productivity and already come into use (hereinafter CD-ROMs are included in CDs for convenience). Information on the CDs is reproducible through optical disk reproducing devices for only reproduction (CD players or CD-ROM drives).

FIG. 11 and FIG. 12 are schematic views illustrating a signal format used in the CDs. As shown in FIG. 11, a frame 50a of a recording signal is composed of a frame synchronizing signal 50b indicating a head of the frame, a sub-code 50c for additional information data, and a data field 50d having 24-byte main information data and 8-byte error detection and correction parity code added thereto.

In addition, the data field 50d is formed by an error detecting and correcting method including non-complete interleaving called CIRC (Cross Interleaved Reed Solomon Code).

As shown in FIG. 12, ninety-eight of the frame 50a form a sub-coding frame 51a (hereinafter referred to as a sector). Further, ninety-eight of the sub-code 50c in each frame 50a form a sub-coding block 51c. Information such as track numbers (corresponding to music numbers when main information is of music programs), and absolute address information on the disk are indicated by data in the sub-coding block 51c.

Since the length of each sector corresponds to 13.3 [ms], seventy five sectors are equivalent to a second. In this case, sector numbers on the disk can be described based on the following data, "minute": "second": "a sector number in one second (taking a value from 00 through 74)". The sector number corresponds to successive time-indicating information and position-indicating information and consecutively increases from an innermost portion to an outermost portion of the disk.

The frame synchronizing signal 51b and the data field 51d are respectively composed of ninety-eight frames of the frame synchronizing signal 50b and ninety-eight frames of data field 50d.

FIG. 10 is a typical depiction illustrating an area allocation on the CD or the CD-ROM. A disk 52 is provided with a main information recording area 52b and a TOC (Table of Contents) area 52a. The main information recording area 52b stores main information such as music information and sector numbers of the sub-code 50c. On the other hand, the TOC area 52a stores additional information related to each piece of main information recorded in the main information recording area 52b, such as a track number and a recording start sector number of each track recorded by using the sub-code 50c. In the TOC area 52a, other kinds of additional information are also recorded by using the sub-code 50c such as control information for determining whether information recorded on a track is audio information such as music information or computer-use data.

According to the format, when loading the disk 52 into the CD player or CD-ROM drive, information defined by the sub-code 50c in the TOC area 52a is reproduced, then the number of main information (corresponding to the number of music programs for music information), sector numbers of recording start positions of respective information and a sort of information (whether successive information such as audio information or discrete information such as computer-use data) are recognized. Thereafter, an access operation to a desired track is promptly carried out upon receiving instructions to perform a reproducing operation by collating information in the TOC area 52a with sector numbers of the sub-code 50c in the main information recording area 52b.

When recording on the CDs or CD-ROM drives, a so-called CLV (Constant Linear Velocity) system is employed for a rotation control. With this system, a recording density becomes constant at any position of the disk. This characteristic is preferable for increasing a recording capacity. In the CD players or the CD-ROM drives, the CLV control is carried out by controlling a disk rotation such that an interval of the reproduced signal, for example, the frame synchronizing signal, which is recorded on the CD or CD-ROM at CLV, becomes a reference length.

When using a re-writable disk such as a magneto-optical disk which has been recently developed, whereon various types of information such as music information, computer-use data, etc., are recorded, the information recording and reproducing apparatus is preferably designed to be compatible with the conventional CD player by employing a common reproducing method.

In this case, especially for a disk whereon information has not been recorded (hereinafter referred to as a blank disk), an access operation to sector positions prior to recording nor the CLV control required during the recording operation cannot be carried out. This is because the blank disk does not store absolute address information defined by the sub-code of the signal format used in the CDs or CD-ROMs nor the frame synchronizing signal used in the CLV control.

To counteract the above-mentioned problems, the following method is proposed as an alternative method for recording absolute addresses without using the sub-code information. In this method, guiding grooves on the disk are deviated inward or outward in a radial direction, or the widths of the guiding grooves on the disk are varied depending on the value of each bit: "0" or "1" after being "biphase-mark" modulated (for example, see U.S. Pat. No. 4,907,216).

In this case, if a frequency band of a "biphase-mark" modulated absolute addresses and a frequency band of "EFM" (Eight to Fourteen Modulation) modulated recording information are set to differ, the respective reproducing operations can be performed separately. This enables access to an area even whereon no information has been recorded by using the absolute addresses associated with the guiding grooves.

Moreover, by using a reproduction carrier component of the absolute address, an accurate CLV control can be attained. This is also true during the recording operation.

The control information such as position-indicating information related to each piece of main information recorded using the discussed method is recorded by the sub-code in response to the absolute address information stored in a predetermined area of the disk, i.e., a TOC area. With this arrangement, upon loading the disk, the sub-code information stored in the TOC area is reproduced. As a result, the control information related to each piece of main information is recognized, thereby promptly carrying out a reproducing operation from a desired track according to the instructions for reproduction as in the case of the conventional CD players.

As to the recording operation, whether or not the main information has been recorded is determined by using the control information, thereby performing a follow-up recording or rewriting operation. The control information also serves for protecting the recorded information.

The discussed recording medium whereon a user can record information is a blank disk storing only pre-recorded address information, etc., when the user obtains the disk from a manufacturer.

In the information recording and reproducing apparatus, when loading the re-writable disk, first, a reproducing operation is carried out from the TOC area. Next, it is determined whether or not the disk stores information to be reproduced, or whether or not there still have a recordable area in the main information recording area. Here, when the loaded disk is determined to be a blank disk, it is determined that the reproducing operation cannot be performed from the disk, since the disk does not store any pieces of control information in the TOC area. In such a case, the disk is considered as a blank disk. This means that the entire main information recording area is recognized as a recordable empty area.

However, in adopting the discussed method, the following problems may arise. In the case where a reproducing function is damaged of the information recording and reproducing apparatus, even if useful main information and the control information related to each piece of main information have been recorded on the disk, it would be determined that the reproducing operation of the control information cannot be performed from the TOC area. In such a case, the recorded main information cannot be reproduced. Moreover, additional pieces of main information may be recorded since the entire area is recognized as an empty area, thereby presenting a possibility of destroying the useful main information and the control information which have been already recorded.

The discussed information recording and reproducing apparatus employing the portable recording medium is usually arranged such that the recording operation of the information is performed within a predetermined range of a signal quality. This enables the information recording and reproducing apparatus to be compatible with other information recording and reproducing apparatuses. However, in practice, the problem may arise in that the information recorded on the disk with an information recording and reproducing apparatus A can be reproduced with the information recording and reproducing apparatus A but with an information recording and reproducing apparatus B due to the differences in their performances including a degree of deterioration or the differences in adaptability to the recording medium.

In this case also, when using the information recording and reproducing apparatus B, the reproducing operation of the control information cannot be performed from the disk whereon information is recorded using the information recording and reproducing apparatus A. In both cases, since the disk is considered as a blank disk, the reproducing operation of the recorded main information cannot be performed. Moreover, there is a possibility of destroying the useful main information and the control information which have been previously recorded.

In order to counteract this, for example, another method has been proposed wherein the reproducing operation of the information is performed a plurality of times under a constant condition or under different conditions. However, with this method, upon loading a disk, it takes a long time to determine whether or not the disk is a blank disk.

SUMMARY OF THE INVENTION

An object of the present invention is to provide an information recording and reproducing apparatus capable of accurately determining whether or not a recording medium is a recording medium storing no main information in a main information recording area thereof (hereinafter referred to as a blank medium) upon loading the recording medium and eliminating the possibility of destroying useful main information in the main information recording area.

In order to achieve the above-mentioned objective, an information recording and reproducing apparatus in accordance with the present invention for recording and reproducing on and from a recording medium including a main information recording area wherein plural pieces of main information can be recorded and a control information recording area wherein control information related to each piece of main information in the main information recording area can be recorded, is characterized in comprising: reproduction means for reproducing the control information from the control information recording area upon loading the recording medium; control information detection means for detecting whether or not any pieces of control information exist in the control information recording area upon reproducing from the control information recording area; and inhibit means for inhibiting a recording operation in the main information recording area when a reproducing operation of the control information cannot be performed by the reproduction means, and it is detected by the control information detection means that the control information exists in the control information recording area.

With the above-mentioned arrangement, upon loading the recording medium into the information recording and reproducing apparatus, reproducing operation is performed from the control information recording area by the reproduction means, in the mean time, the control information detection means detects whether or not any pieces of control information exist in the control information recording area. When it is detected that no piece of control information exists in the control information recording area, the loaded recording medium is accurately determined to be a blank medium. On the other hand, when it is detected by the control information detection means that the control information exists in the control information recording area, it is determined that the recorded main information also exists in the main information recording area. In such a case, a recording operation in the main information recording area is inhibited, thereby eliminating the possibility of destroying the useful main information in the main information recording area.

Further, in order to achieve the above-mentioned objective, another information recording and reproducing apparatus in accordance with the present invention for recording and reproducing on and from a recording medium including a main information recording area wherein plural pieces of main information can be recorded and a control information recording area wherein control information related to each piece of main information in the main information recording area can be recorded, is characterized in comprising: reproduction means for reproducing the control information from the control information recording area upon loading the recording medium; self-checking means for checking whether or not a reproducing function of the apparatus works properly; and inhibit means for inhibiting a recording operation in the main information recording area when a reproducing operation cannot be performed from the control information recording area by the reproduction means, and it is detected by the self-checking means that the reproducing function of the apparatus does not work properly.

With this arrangement, if the reproducing operation cannot be performed from the control information recording area upon loading the recording medium into the apparatus, this might be causes by either of the following situations: (1) the recording medium is a blank medium storing no piece of control information; or (2) the reproducing function of the apparatus does not work properly.

With the apparatus of the present invention, the self-checking means determines whether or not the reproducing function of the apparatus works properly. If so, the recording medium is determined to be a blank medium. Namely, since whether or not the loaded recording medium is a blank medium is determined only after confirming that the reproducing function of the apparatus works properly, the result of this determination can be fairly reliable.

On the other hand, when it is detected by the self-checking means that the reproducing function of the apparatus does not work properly, even if the reproducing operation cannot be performed from the control information recording area, it would not be determined that the recording medium is a blank medium. Therefore, at least the possibility of destroying the useful main information recorded in the main information recording area can be eliminated by inhibiting the recording operation.

Another object of the present invention is to provide an information recording and reproducing apparatus capable of promptly and accurately determining whether or not the recording medium is a blank medium upon loading the recording medium.

In order to achieve the above-mentioned objective, an information recording and reproducing apparatus in accordance with the present invention for recording and reproducing on and from a recording medium including a main information recording area wherein plural pieces of main information can be recorded and a control information recording area wherein control information related to each piece of main information in the main information recording area can be recorded, is characterized in comprising: blank medium detection means for detecting whether or not any pieces of main information exist in the main information recording area of the loaded recording medium; and recording means for recording in the control information recording area distinctive information indicating no piece of main information in the main information recording area when it is detected by the blank medium detection means that no piece of main information exists in the main information recording area of the loaded recording medium.

With this arrangement, when it is detected by the blank medium detection means that the recording medium loaded in the information recording and reproducing apparatus is a blank medium, the distinctive information indicating a blank medium is recorded in the control information recording area of the recording medium by the recording means. Thereafter, upon loading the recording medium into the apparatus, the distinctive information is reproduced, whereby whether or not the recording medium is a blank medium is promptly and accurately determined.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a flow chart showing steps of process control after loading a disk into an information recording and reproducing apparatus.

FIG. 2 is a block diagram showing a schematic configuration of an information recording and reproducing apparatus.

FIG. 3 is a block diagram showing an essential part of a recorded area detection circuit in an information recording and reproducing apparatus.

FIG. 4 is a block diagram showing an essential part of another recorded area detection circuit in an information recording and reproducing apparatus.

FIG. 5 is a schematic plan view illustrating a magneto-optical disk.

FIG. 6 is an enlarged partial plane view illustrating the magneto-optical disk of FIG. 5.

FIG. 7 is a flow chart showing steps of process control after loading a disk into another information recording and reproducing apparatus.

FIG. 8 is a flow chart showing steps of process control after loading a disk into still another information recording and reproducing apparatus.

FIG. 9 is a block diagram illustrating an information recording and reproducing apparatus which carries out a process control according to the flow chart in FIG. 7 or 8.

FIG. 10 is a schematic plan view showing a compact disk.

FIG. 11 is a typical depiction illustrating a frame signal format of a compact disk.

FIG. 12 is a typical depiction illustrating a sector format of a compact disk.

DESCRIPTION OF THE EMBODIMENTS

Referring to FIG. 1 through FIG. 6, the following description will discuss the first embodiment of the present invention.

Figure 5:
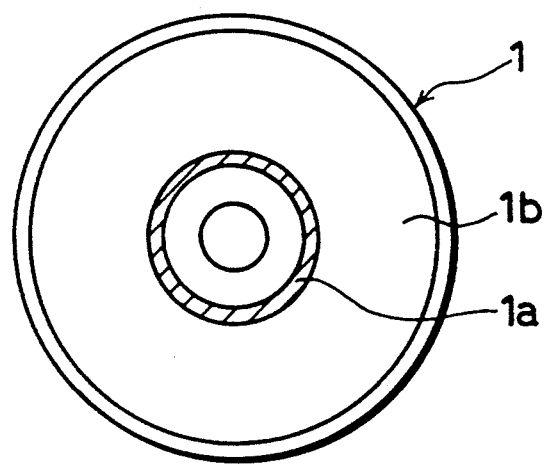

As shown in FIG. 5, a magneto-optical disk 1 as a re-writable recording medium is provided with a TOC (Table of Contents) area 1a (control information recording area) and a main information recording area 1b.

The TOC area 1a (shown by hatching for convenience) is provided in an innermost end part of the magneto-optical disk 1. Most of area other than the TOC area 1a is occupied by the main information recording area 1b. The main information recording area 1b is provided for recording therein main information such as music information. On the other hand, the TOC area 1a is provided for recording therein control information related to each piece of main information in the main information recording area 1b, for example, information regarding music number for each piece of information, a starting absolute address position and an ending absolute address position for each piece of music information.

Figure 11:
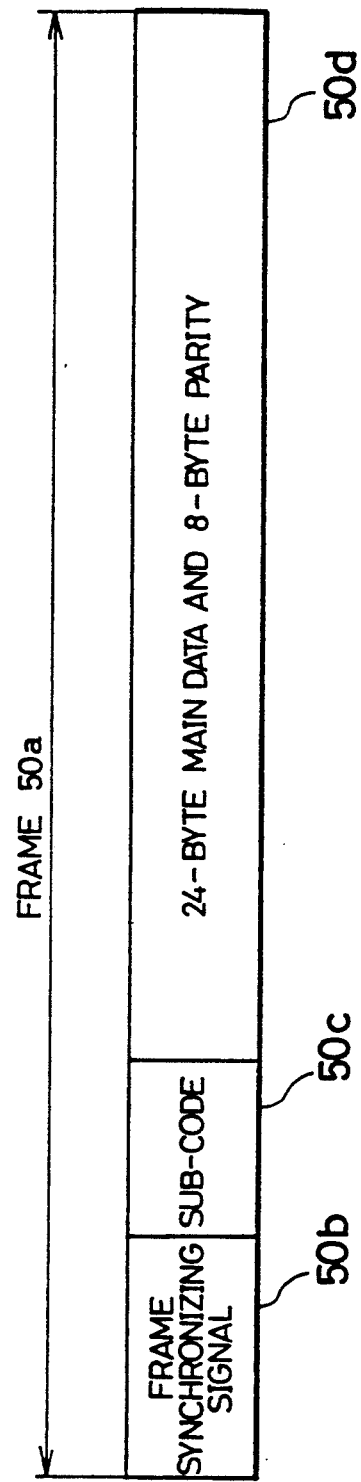
Figure 12:
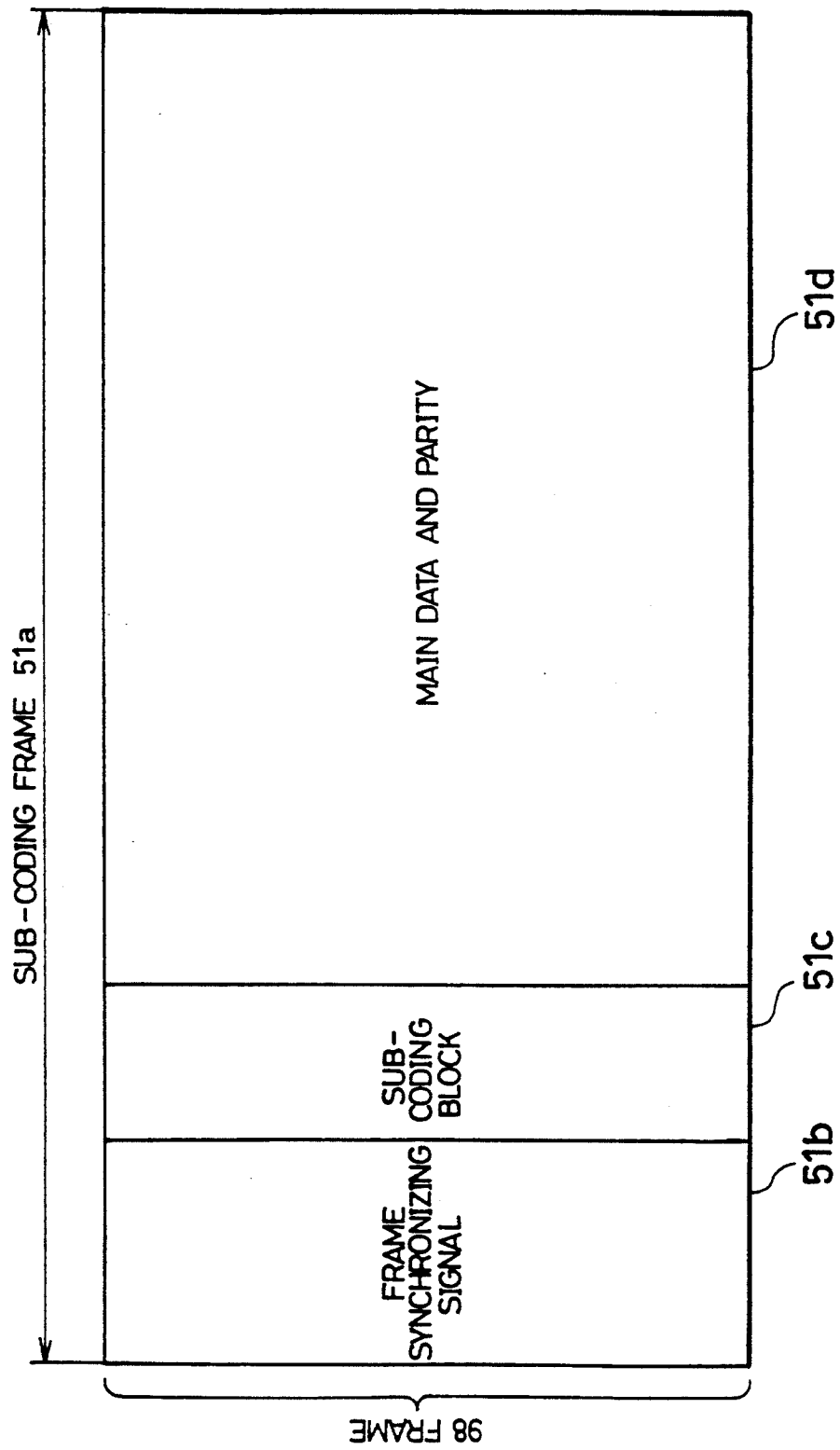

A signal format being employed here is the same as those shown in FIGS. 11 and 12, thus the description thereof shall be omitted here.

Figure 6:
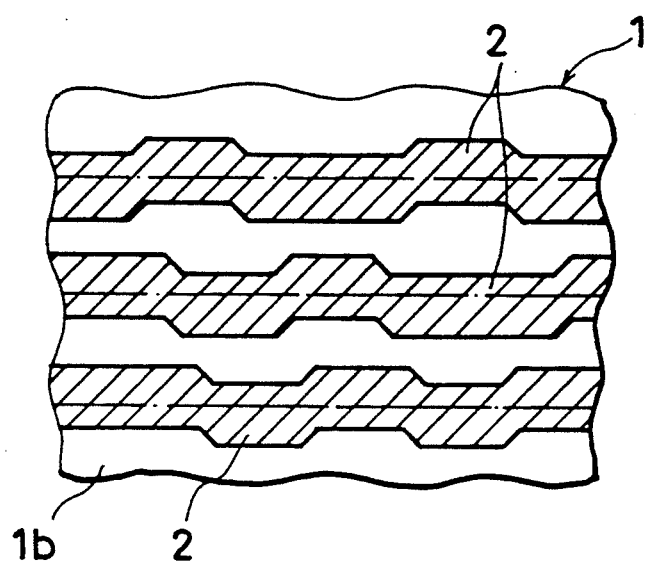

As shown in FIG. 6, spiral guiding grooves 2 (shown by hatching) are formed in advance in the TOC area 1a and the main information recording area 1b in the magneto-optical disk 1 at a determined interval in a radial direction.

After being "biphase-mark" modulated, the absolute addresses on the disk are recorded as pre-recorded information by deviating the guiding grooves 2 inward or outward in a radial direction of the magneto-optical disk 1 according to the value of each bit: "1" or "0". The absolute addresses indicating positions on the disk are the pre-recorded information used for a rotation control at CLV (Constant Linear Velocity). In addition, the absolute addresses here correspond to respective sectors in the CD (Compact Disk) format, and thus called simply a sector number hereinbelow.

Figure 2:
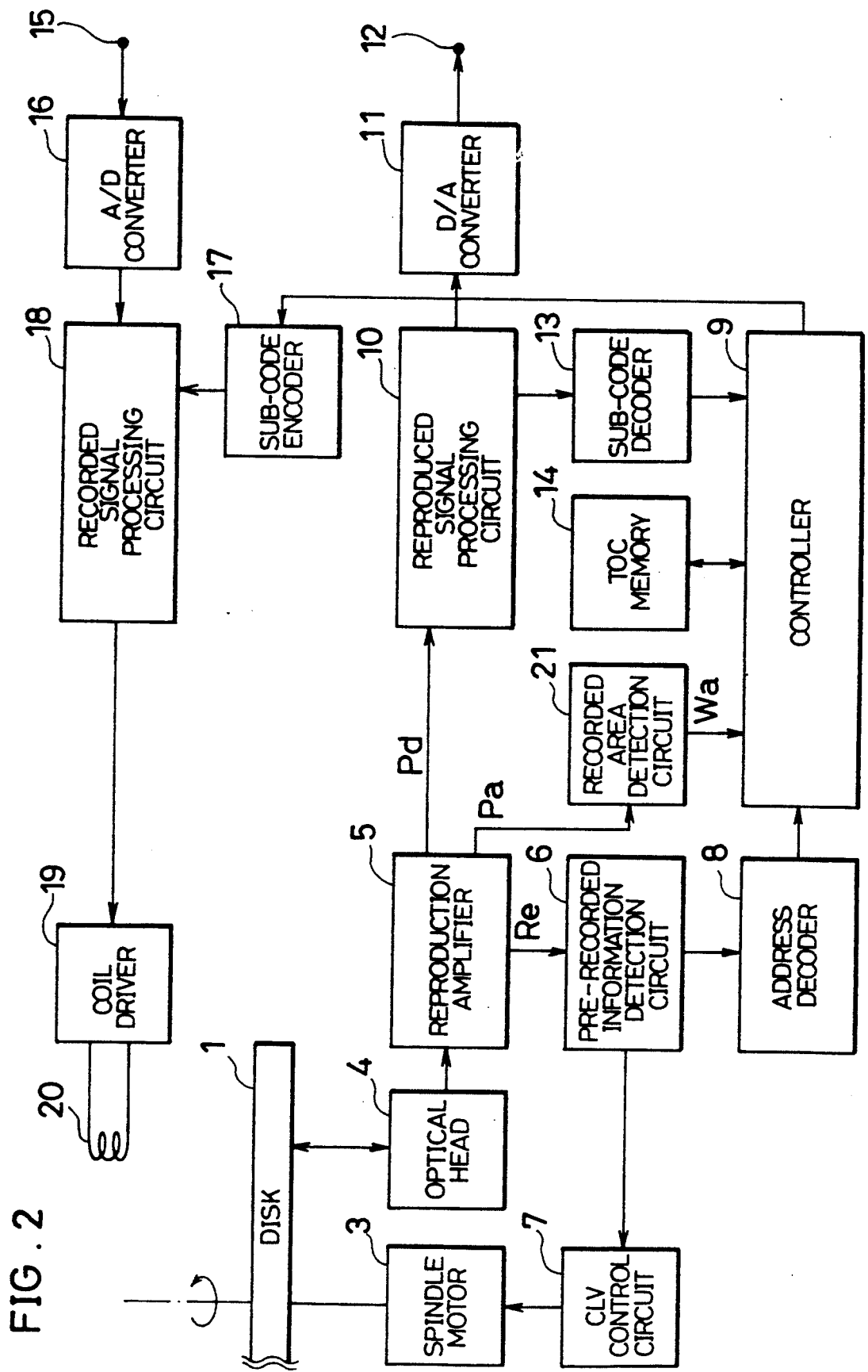

As shown in FIG. 2, the information recording and reproducing apparatus comprises: a spindle motor 3 for supporting and rotating the magneto-optical disk 1; and an optical head 4 (reproduction means) for reproducing the recorded information by projecting a laser beam onto the magneto-optical disk 1.

A signal reproduced by the optical head 4 is amplified by a reproduction amplifier 5. The reproduction amplifier 5 sends an analog magneto-optical signal Pa to a recorded area detection circuit 21 (blank medium detection means and control information detection means), in the mean time, sends a digital magneto-optical signal Pd to a reproduced signal process circuit 10.

After passing through the reproduction amplifier 5, the signal reproduced by the optical head 4 is sent to a pre-recorded information detection circuit 6 where the pre-recorded information is extracted. The pre-recorded information detection circuit 6 is composed of, for example, a band pass filter and a PLL (Phase Locked Loop). The PLL generates a clock in synchronous with the pre-recorded information (a signal generated by modulating the absolute address in a form of "biphase-mark") in the reproduced signal extracted by the band pass filter. Then, the clock, in synchronous with the pre-recorded information, is sent to a CLV control circuit 7.

In the CLV control circuit 7, the clock in synchronous with the pre-recorded information from the pre-recorded information detection circuit 6 is compared with a reference frequency (reference clock) generated inside the device. Then, a rotation speed of the spindle motor 4 is controlled based on a resulting difference signal by the CLV control circuit 7, thereby ensuring an accurate CLV control.

Further, the pre-recorded information in the reproduced signal extracted by the pre-recorded information detection circuit 6 is sent to an address decoder 8. The address decoder 8 is composed of, for example, a biphase-mark demodulation circuit and an address decoder. The pre-recorded information extracted by the pre-recorded information detection circuit 6 is demodulated in the form of "biphase-mark" by a biphase-mark demodulation circuit. Thereafter, it is converted by the address decoder into an absolute address on the magneto-optical disk 1, i.e., a sector number, then the sector number is sent to a controller 9.

The digital magneto-optical signal Pd is sent to a reproduced signal processing circuit 10 which separates a frame synchronizing signal from the digital magneto-optical signal Pd. The reproduced signal processing circuit 10 also demodulates the frame synchronizing signal in the form of "EFM" (Eight to Fourteen Modulation). The sub-code information separated from the "EFM" modulated signal by the reproduced signal processing circuit 10 is sent to a sub-code decoder 13. The reproduced signal processing circuit 10 also makes an error correction by means of CIRC (Cross Interleaved Reed Solomon Code) using a parity in the reproduced data. The reproduced data having done the error correction by the reproduced signal processing circuit 10 is outputted to an external device via a terminal 12 after being converted back into an analog audio signal by a D/A (Digital/Analog) converter 11.

The sub-code decoder 13 decodes sub-code information of the reproduced signal from the reproduced signal processing circuit 10. Then, the decoded sub-code information is sent to the controller 9.

In the recorded area detection circuit 21, a detecting operation is carried out to determine whether or not information has been recorded based on a magneto-optical signal Pa from the reproduction amplifier 5. Then, the results of the detection is sent to the controller 9 as a recorded area detecting signal Wa.

On the other hand, an analog audio signal inputted from a terminal 15 is converted into a digital audio signal by an A/D (Analog/Digital) converter 16. Thereafter, the digital audio signal is sent to a recorded signal processing circuit 18. In the recorded signal processing circuit 18, an error detection and correction parity is generated, then the parity is added to the digital audio signal from the A/D converter 16. In the mean time, the sub-code from a sub-code encoder 17 is added to the digital audio signal. Then, after being "EFM" modulated, a frame synchronizing signal is further added to the digital audio signal. Thereafter, the digital audio signal is sent to a coil driver 19.

The coil driver 19 drives a coil 20 (having a function as a recording means) based on the input signal; in the mean time, a laser beam used in recording is projected from the optical head 4 onto the magneto-optical disk 1, thereby recording the signal.

The controller 9 for receiving an absolute address (sector number) from the address decoder 8 recognizes a radial position on the magneto-optical disk 1 of the optical head 4. In addition, the controller 9 has an access function by which the optical head 4 is moved to a desired radial position by utilizing a moving function (not shown).

The controller 9 recognizes the sub-code information from the sub-code decoder 13. Then, if the sub-code information matches the content of the TOC area 1a, the sub-code information is recorded in a TOC memory 14 as control information by the controller 9. The controller 9 also reads out the control information from the TOC memory 14 if necessary.

Further, in the case where additional main information is recorded in the main information recording area 1b, the control information in the TOC memory 14 is rewritten by the controller 9. In recording the control information in the TOC area 1a, the controller 9 reads out the content of the information in the TOC memory 14 then sends the information to the sub-code encoder 17. On the other hand, in the case of a blank disk, the controller 9 generates distinctive information indicating a blank disk then sends the distinctive information to the sub-code encoder 17 as control information. After having gone through the above-mentioned recording process, the sub-code information in the TOC memory 14 or the distinctive information indicating a blank disk is recorded as control information in the TOC area 1a.

The controller 9 also serves to determine whether or not the magneto-optical disk 1 is a blank disk upon loading a disk based on the recorded area detecting signal Wa from the recorded area detection circuit 21, then carries out the following controls.

Figure 3:
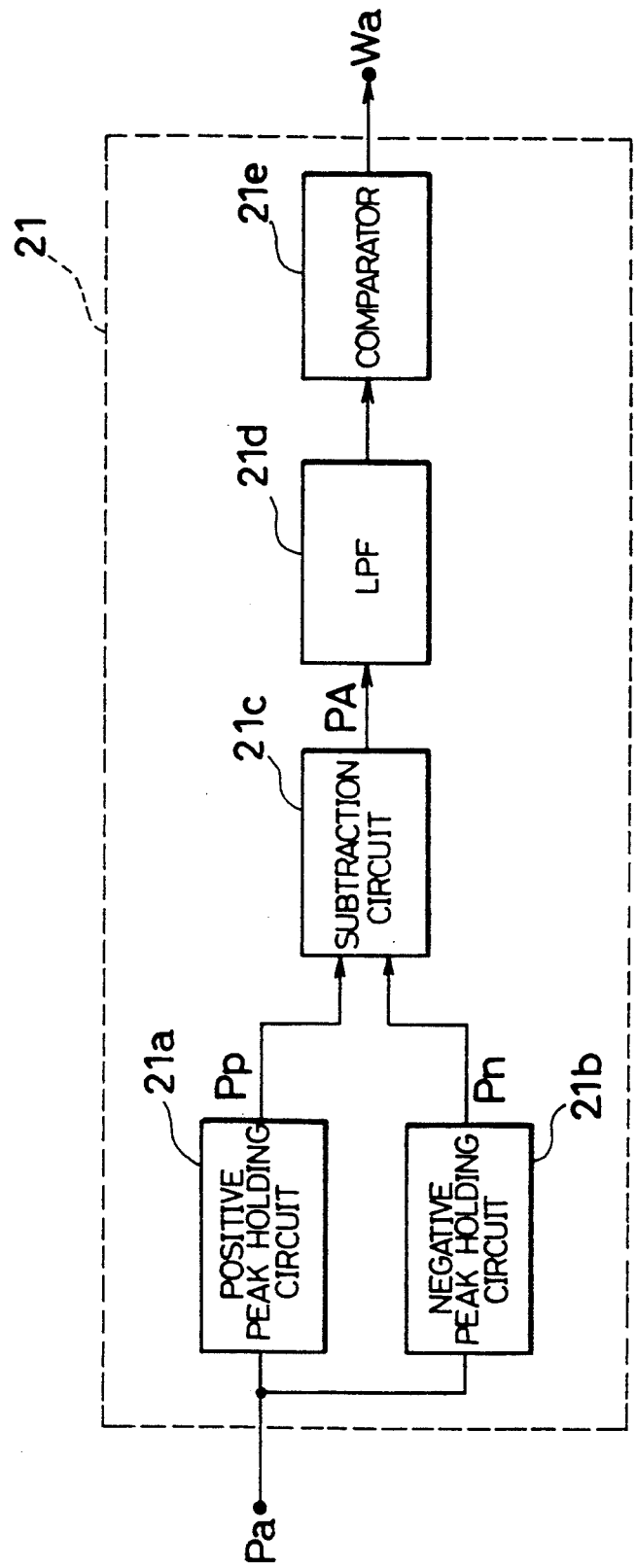

FIG. 3 is a block diagram showing a configuration of the recorded area detection circuit 21 in detail. The reproduction amplifier 5 (see FIG. 2) sends the analog magneto-optical signal Pa to the recorded area detection circuit 21. Then, the analog magneto-optical signal Pa is inputted into a positive peak holding circuit 21a and a negative peak holding circuit 21b. Here, the positive peak holding circuit 21a is provided for holding a positive maximum value of the magneto-optical signal Pa with a predetermined time constant. On the other hand, the negative peak holding circuit 21b is provided for holding a negative maximum value of the magneto-optical signal Pa with a predetermined time constant. Further, an amplitude PA of the magneto-optical signal Pa is obtained by subtracting a hold value Pn (negative maximum of the magneto-optical signal Pa) from a hold value Pp of the positive peak holding circuit 21a (positive maximum of the magneto-optical signal Pa). This is done by a subtraction circuit 21c. The amplitude PA is first smoothed by a low pass filter (LPF) 21d. Then, after being digitized by a comparator 21e (digitization means), the amplitude PA is sent to the controller 9 as a recorded area detecting signal Wa.

Figure 1:
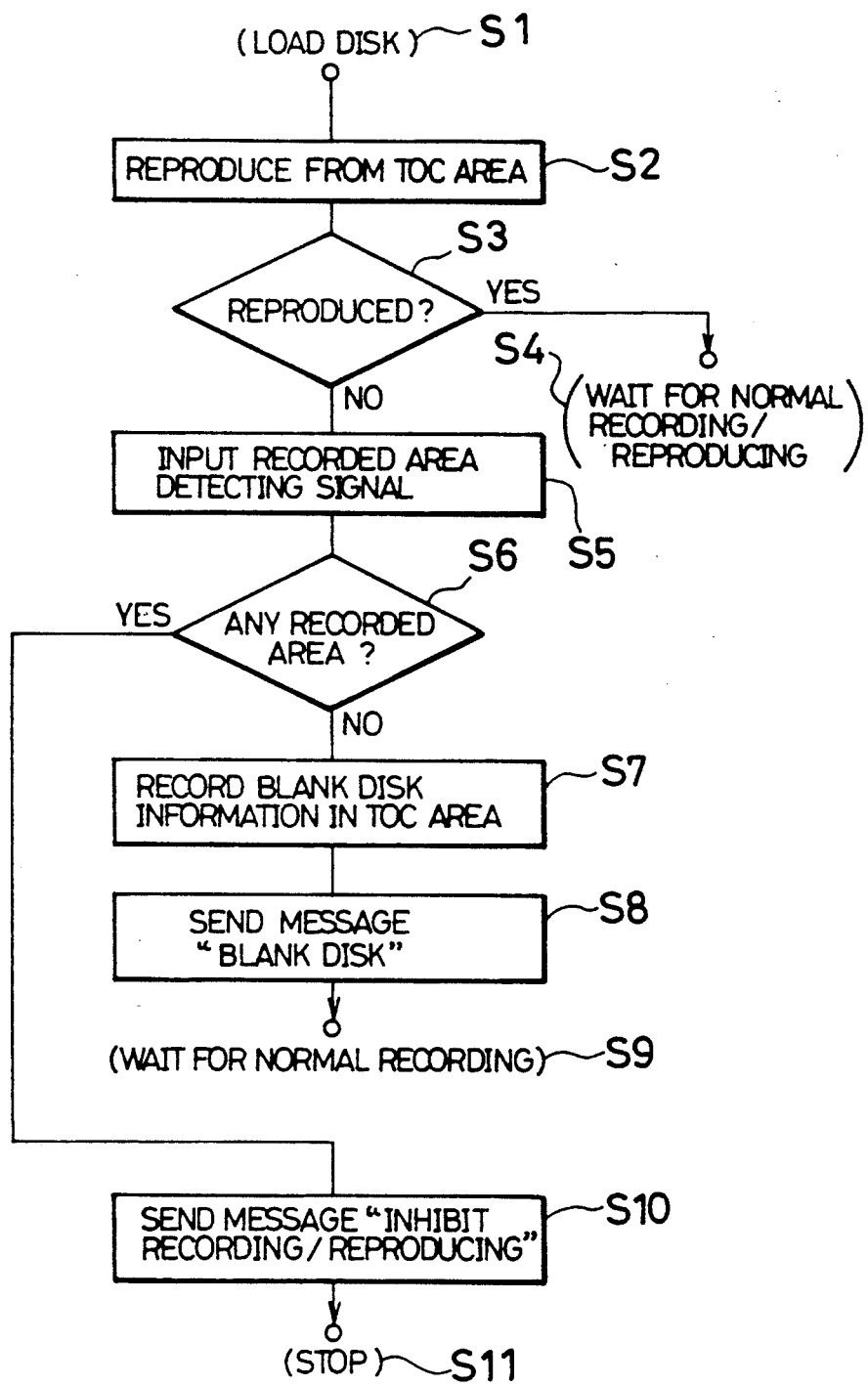
FIGS. 1 through 9 describe the present invention in detail.

FIG. 1 is a flow chart showing the steps of the control process mainly done by the controller 9 after loading the disk into the information recording and reproducing apparatus of the present embodiment.

When loading the magneto-optical disk 1 into the information recording and reproducing apparatus (S 1), first, an attempt is made to reproduce the control information from the TOC area 1a (S 2). Then, it is checked whether or not the reproducing operation of the control information can be carried out (S 3). If so, the sequence is set in standby for a normal recording or reproducing operation (S 4). The above-mentioned steps are carried out when satisfying the following two conditions: The magneto-optical disk 1 stores both the main information and the control information. The reproducing function of the information recording and reproducing apparatus works properly.

On the other hand, if the reproducing operation of the control information cannot be carried out in S 3, the reproducing operation is carried out again from the TOC area 1a so that the recorded area detection circuit 21 sends the recorded area detecting signal Wa for detecting the amplitude of the reproduced signal to the controller 9 (S 5). Based on the recorded area detecting signal Wa, it is determined whether or not the TOC area 1a stores any pieces of control information, in other words, whether or not any recorded area exists in the TOC area 1a (S 6). The reproducing operations from the TOC area 1a in S 2 and in S 5 are described as two different steps in FIG. 1 for convenience in the explanation. In practice, however, these two reproducing operations in S 2 and S 5 can be carried out at the same time.

When it is determined in S 6 that the recorded area does not exist in the TOC area 1a based on the recorded area detecting signal Wa, the distinctive information indicating a blank disk is recorded in the TOC area 1a (S 7). The distinctive information can be in a form of a preset code indicating a blank disk. For example, in the case where the control information in the TOC area 1a is composed of a group of the control information related to each piece of main information and a control information ending code added at the end of the group of the control information, it is preferably arranged such that only the control information ending code is recorded as distinctive information indicating a blank disk.

The recording operation in the TOC area 1a is carried out as described hereinbelow. First, the optical head 4 is moved to a radial position corresponding to the TOC area 1a by the optical head moving means of the optical head 4. Next, the controller 9 generates the distinctive information indicating a blank disk and sends it to the sub-code encoder 17. Based on the distinctive information, a predetermined magnetic field is applied through the coil 20. In the mean time, a laser beam used in recording is projected from the optical head onto the magneto-optical disk 1. Here, in order to surely and promptly determine whether or not the disk is a blank disk, the distinctive information is preferably recorded at a starting position of the reproducing operation from the TOC area 1a.

When it is determined that the magneto-optical disk 1 is a blank disk, the distinctive information indicating a blank disk is recorded in the TOC area 1a as mentioned above. In the mean time, a message indicating a blank disk is shown on, for example, a display (not shown) (S 8). Thereafter, the sequence is set in standby for a normal recording operation (S 9). These steps are carried out when satisfying the following two conditions: The reproducing function of the information recording and reproducing apparatus works properly. The loaded magneto-optical disk 1 is a blank disk.

On the other hand, when it is determined in S 6 that the recorded area exists in the TOC area 1a based on the recorded area detecting signal Wa, a message indicating "inhibit recording/reproducing" is shown on the display (S 10). Then, the sequence is terminated (S 11). These steps are carried out when satisfying the following two conditions: The magneto-optical disk 1 stores both the main information and the control information. The reproducing function of the information recording and reproducing apparatus does not work properly.

As described above, using the result of the reproducing operation from the TOC area 1a and the recorded area detection circuit 21, whether or not the magneto-optical disk 1 is a blank disk can be accurately determined upon loading the disk. When the loaded disk is determined to be a blank disk, the distinctive information indicating a blank disk is recorded in the TOC area 1a of the magneto-optical disk 1. Thereafter, the disk can be promptly determined to be a blank disk upon loading the disk by the distinctive information. In addition, when the reproducing operation cannot be carried out from the TOC area 1a and it is detected that the recorded area exists in the TOC area 1a, a recording operation is inhibited. This permits to eliminate a possibility of destroying the information recorded on the disk that occurs when reproducing with an information recording and reproducing apparatus whose reproducing function does not work properly.

Figure 4:
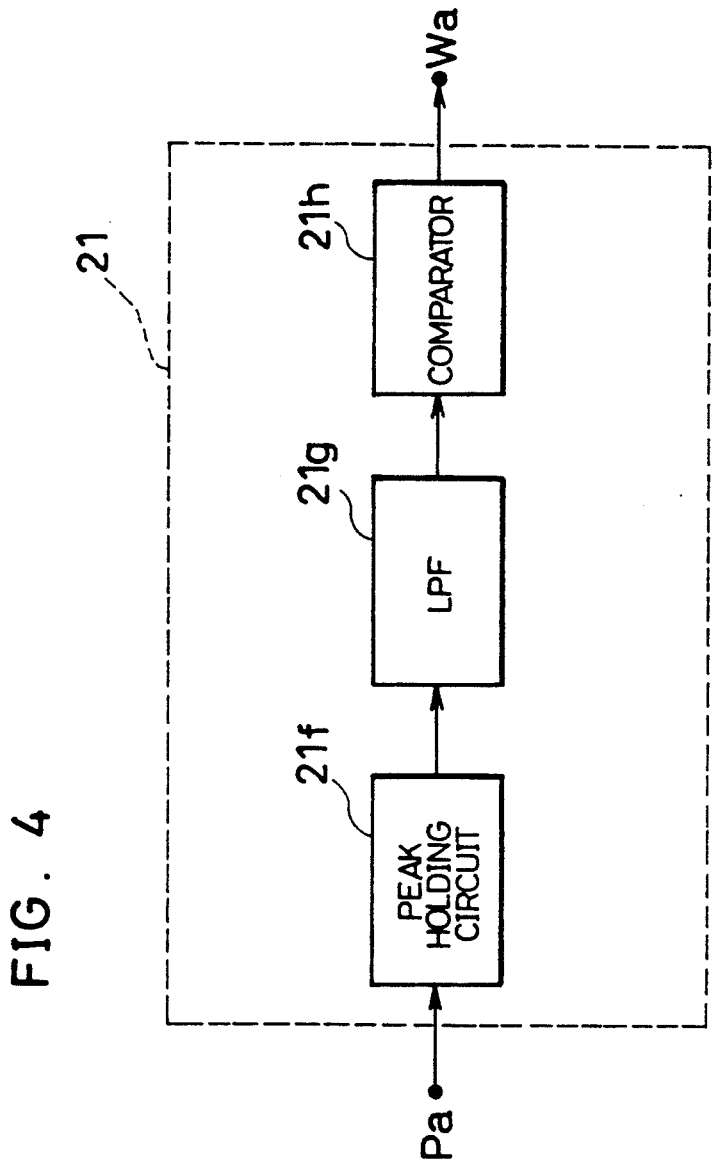

Another arrangement of the recorded area detection circuit 21 is described next. The recorded area detection circuit 21 shown in FIG. 4 is a simplified model of the recorded area detection circuit 21 shown in FIG. 3. The magneto-optical signal Pa from the reproduction amplifier 5 (see FIG. 2) is inputted into a peak holding circuit 21f. In the peak holding circuit 21f, a maximum value of the magneto-optical signal Pa is maintained with a predetermined time constant. The hold value in the peak holding circuit 21f is smoothed by a low pass filter (LPF) 21g. Then, after being digitized in a comparator 21h, the hold value is sent as a recorded area detecting signal Wa.

In addition, the arrangement of the recorded area detection circuit 21 is not limited to the discussed arrangement wherein whether or not the TOC area stores any pieces of control information is determined based on the amplitude of the reproduced signal. The arrangements known in the art may be used as well.

In the present embodiment, the information recording and reproducing apparatus designed for audio information is employed in the present invention, however, other types of information recording and reproducing apparatuses may be used as well such as those designed for computer-use data. As to a signal format, it should be understood that the present invention is not intended to be limited to the signal format for CDs shown in FIGS. 11 and 12.

Further, in the flow chart of FIG. 1, a display is used as an example of a means for displaying a message, however, in the case of dealing with computer-use data, the massage is preferably sent as a status from the information recording and reproducing apparatus to a host device connected thereto.

In the above embodiment, the magneto-optical disk 1 is employed as a recording medium. However, other re-writable type recording media such as phase-change type one may be employed as well.

While preferred embodiments has been described using the disc-shaped recording media, card-shaped or tape-shaped ones may be used as well, as long as they do not depart from the slope of the present invention.

As aforementioned, the information recording and reproducing apparatus in accordance with the present embodiment includes the reproduction means for reproducing the control information from the control information recording area upon loading the recording medium; the control information detection means for detecting whether or not any pieces of control information exist in the control information recording area; the recording means for recording in the control information recording area the distinctive information indicating no piece of main information in the main information recording area of the loaded recording medium when it is detected by the control information detection means that no piece of control information exists in the control information recording area of the loaded recording medium; and inhibit means for inhibiting a recording operation in the main information recording area when a reproducing operation of the control information cannot be performed by the reproduction means and it is detected by the control information detection means that the control information exists in the control information recording area.

With this arrangement, when the control information cannot be reproduced upon loading the recording medium, the control information detection means detects whether or not any pieces of control information exist in the control information recording area. As a result, when no recorded piece of control information exists, whether or not the loaded recording medium is a blank medium whereon main information has not been recorded can be promptly and accurately determined. Further, even in the case where the control information cannot be reproduced from the control information recording area upon loading the recording medium, as long as the control information detection means detects that the control information exists, it will be determined that the main information also exists in the main information recording area. In such a case, the recording operation in the main information recording area is inhibited, thereby eliminating the possibility of destroying the useful main information recorded in the main information recording area. On the other hand, when the recording medium is determined to be a blank medium, the distinctive information indicating a blank medium is recorded in the control information recording area of the recording medium. Thereafter, upon loading the recording medium, the recording medium is promptly and accurately determined to be a blank medium by reproducing the distinctive information indicating a blank medium from the control information recording area.

Another embodiment of the present invention is discussed hereinbelow referring to FIGS. 7 through 9.

Figure 9:
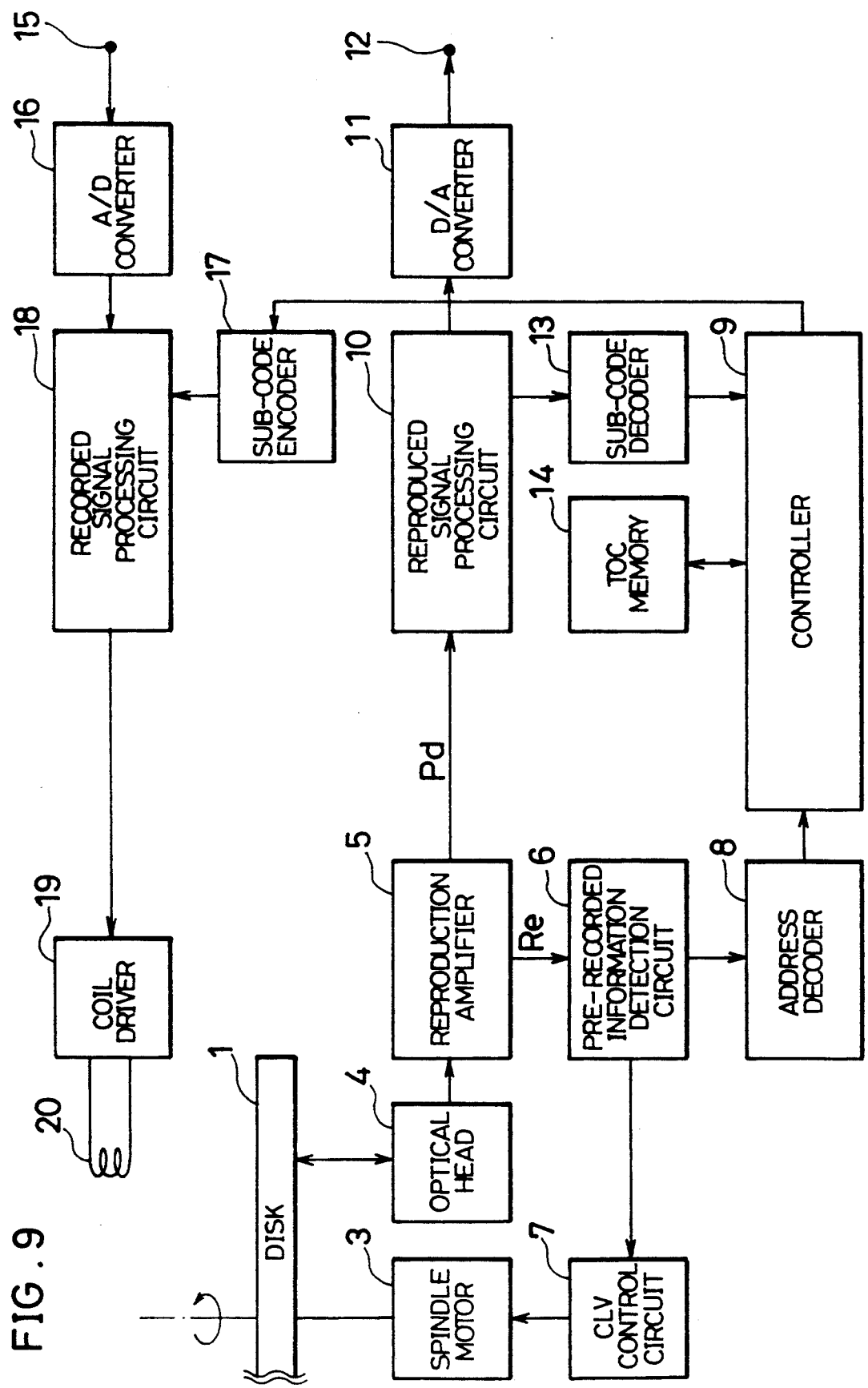
Figure 10:
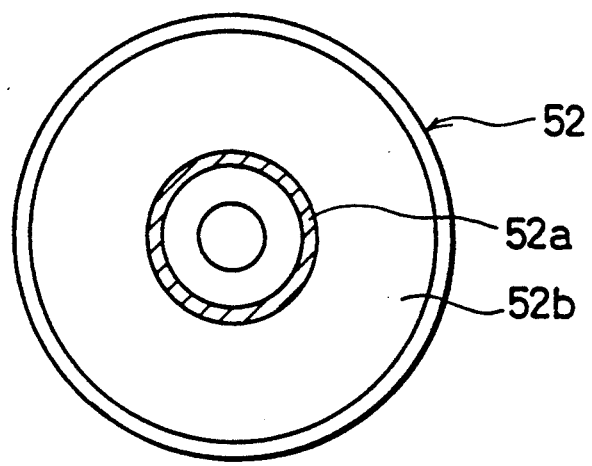
FIGS. 10 through 12 show the prior art.

As shown in FIG. 9, an information recording and reproducing apparatus of the present embodiment has the same configuration as the one shown in FIG. 2 of the previously discussed embodiment except that the recorded area detection circuit 21 is not provided. For convenience, members having the same function as the aforementioned embodiment will be designated by the same reference numeral and description thereof shall be omitted. The controller 9 of the present embodiment having the same function as the previously discussed embodiment is arranged so as to generate test data for a test recording when carrying out a self-checking operation.

Figure 7:
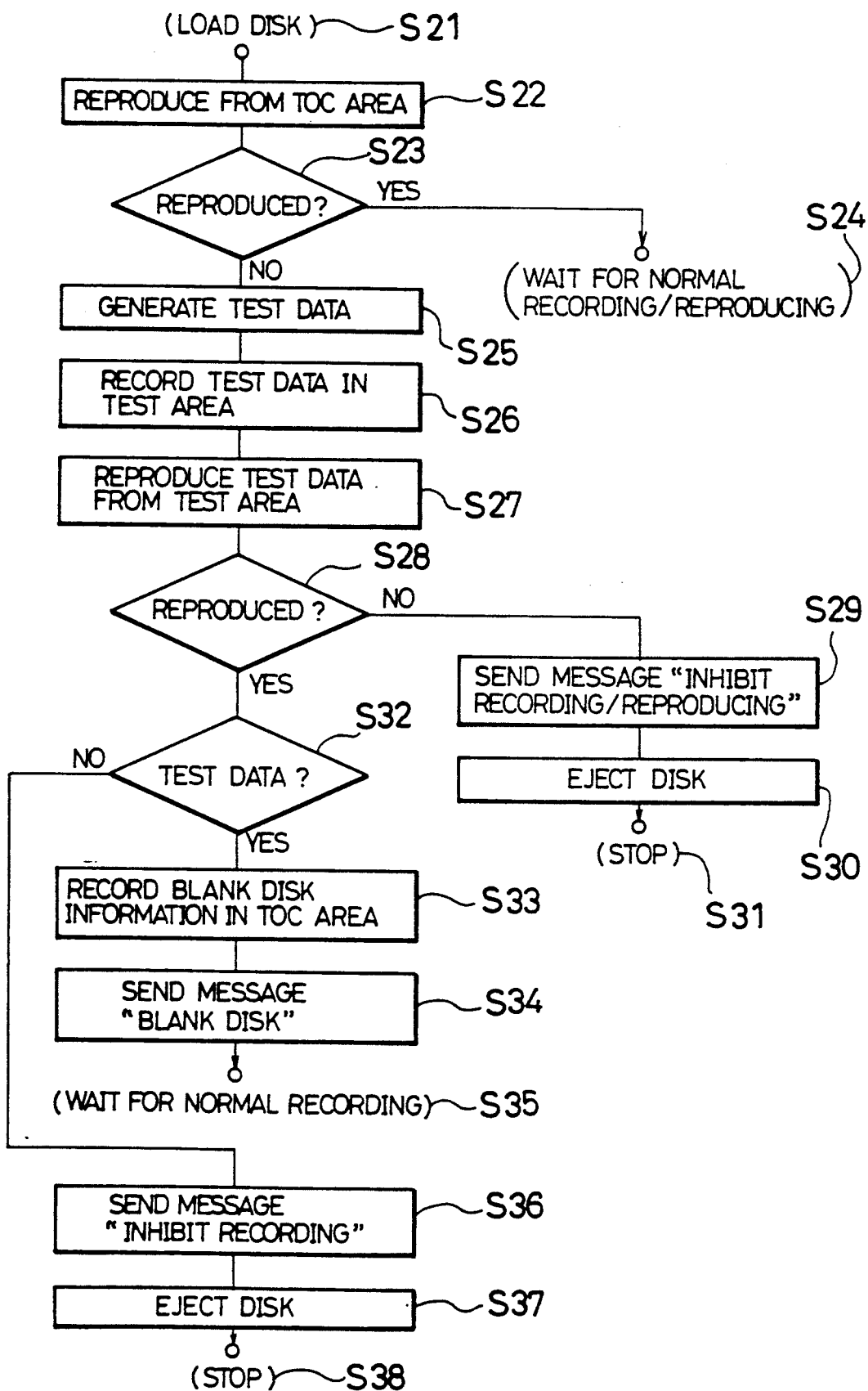
Figure 8:
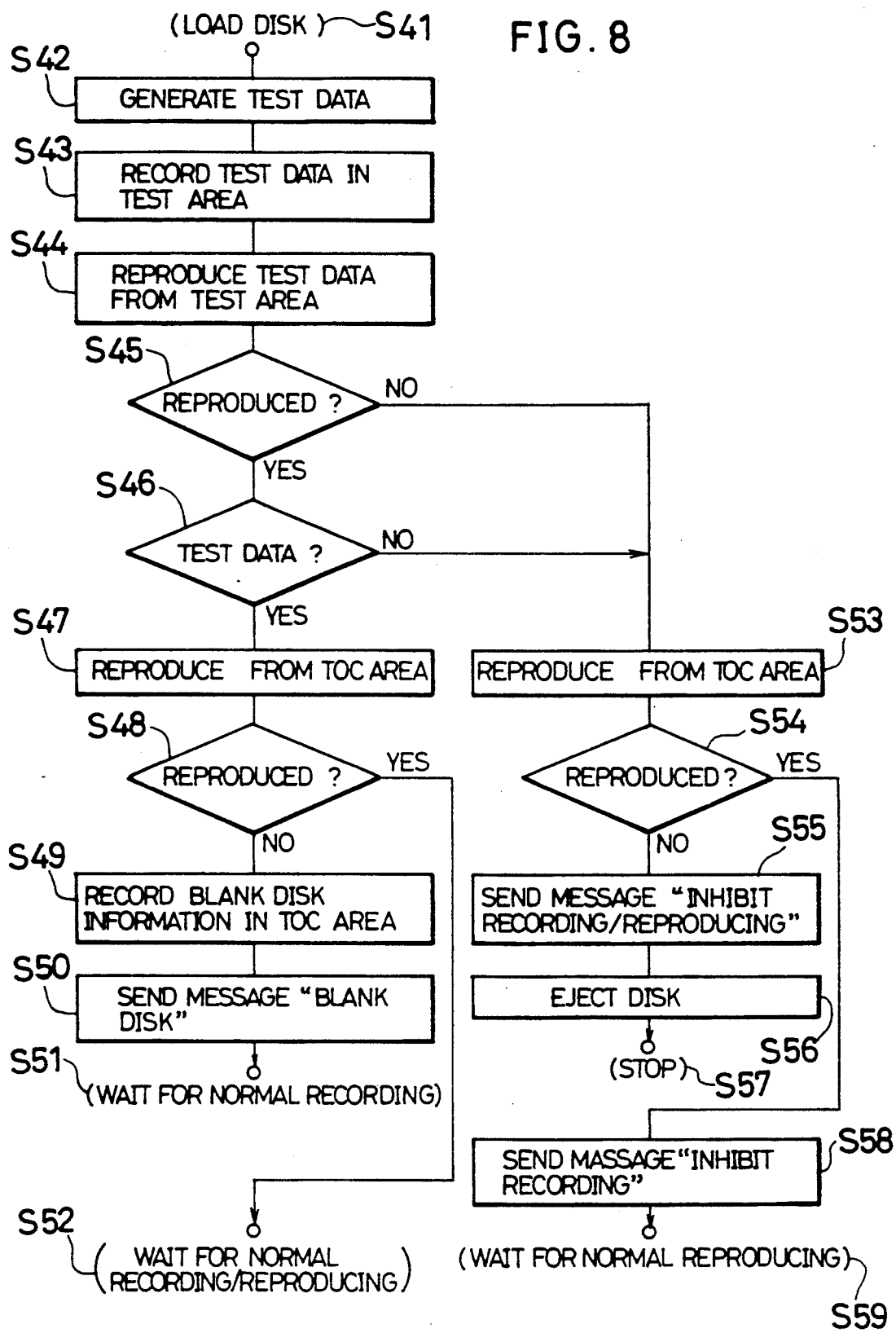

FIG. 7 is a flow chart showing steps of the process control after loading the disk into the information recording and reproducing apparatus of the present embodiment. The control process mainly done by the controller 9 will be discussed hereinbelow.

When loading the magneto optical disk 1 into the information recording and reproducing apparatus (S 21), first, an attempt is made to reproduce the control information from the TOC area 1a (S 22). Then, it is checked whether or not the reproducing operation of the control information can be carried out (S 23). If so, the sequence is set in standby for a normal recording or reproducing operation (S 24). The above-mentioned steps are carried out when satisfying the following two conditions: The magneto-optical disk 1 stores both the main information and the control information. The reproducing function of the information recording and reproducing apparatus works properly.

On the other hand, if the reproducing operation of the control information cannot be performed in S 23, first, test data is generated for a test recording (S 25). Here, the test data is generated by the controller 9 based on predetermined sub-code information in the present embodiment. In order to more accurately determine whether or not the recording function of the apparatus works properly, the test data is preferably generated so as not to be analogous to the previously recorded test data. Here, the test data can be generated, for example, by a random number generator at each time or based on information indicating generation date or time of the test data.

Next, the optical head 4 is moved to a radial position corresponding to the test area on the magneto-optical disk 1 by utilizing a moving function (not shown). Thereafter, the test data is sent to the sub-code encoder 17. Then, based on the test data, a predetermined magnetic field is applied through the coil 20 having a function as a test writing means. In the mean time, a laser beam used in recording is projected onto the magneto-optical disk 1, whereby the test data is recorded in a test area of the magneto-optical disk 1 (S 26). Here, the test area can be provided in a predetermined portion of the TOC area 1a or in a predetermined portion of the main information recording area 1b of the magneto-optical disk 1.

Next, the test data recorded in the test area is reproduced by the optical head 4 (S 27). Then, the test data is sent to the controller 9 via the reproduction amplifier 5, the reproduced signal processing circuit 10 and the sub-code decoder 13. Then, it is checked whether or not the reproducing operation of the control information can be carried out by the controller 9 having a function as a judge means (S 28). If not, a message is shown, for example, on a display (not shown) indicating "inhibit recording/reproducing" (S 29). Here, the magneto-optical disk may be ejected by the controller 9 (inhibit means for inhibiting a recording operation) if necessary (S 30). Then, the sequence is terminated (S 31). The above-mentioned steps are carried out when the recording and/or reproducing function does not work properly.

On the other hand, when the reproducing operation of the test data can be carried out in S 28, it is determined whether or not the reproduced test data coincides with actually recorded test data (S 32). If both test data coincide, it is determined that both the recording and reproducing functions work properly. Then, the distinctive information indicating a blank disk is recorded in the TOC area 1a (S 33). In a mean time, a message indicating a blank disk is shown, for example, on a display (S 34). Then, the sequence is set in standby for a normal recording operation (S 35). These steps are carried out when satisfying the following two conditions: Both the recording and reproducing functions of the information recording and reproducing apparatus work properly. The loaded magneto-optical disk 1 is a blank disk.

Here, in order to surely and promptly determine whether or not the disk is a blank disk, the distinctive information is preferably recorded at a starting position of the reproducing operation from the TOC area 1a as in the case of the previously discussed embodiment.

On the other hand, when it is determined in S 32 that the reproduced test data does not coincide with the actually recorded test data, a message is shown, for example, on a display (not shown) indicating "inhibit recording" (S 36). Here, the magneto-optical disk 1 may be ejected if necessary (S 37). Then, the sequence is terminated (S 38). The above-mentioned steps are carried out when satisfying the following condition: After the test data is recorded on the magneto-optical disk 1 (blank medium) using an information recording and reproducing apparatus whose recording function works properly but reproducing function does not work properly, an attempt is made to reproduce from the disk with another information recording and reproducing apparatus whose recording function does not work properly.

In such a case, in spite of the fact that the loaded magneto-optical disk 1 is a blank disk, the distinctive information indicating a blank disk cannot be recorded in the TOC area 1a, and only the test data is recorded in the test area. This happens through the following process. First, when the magneto-optical disk 1 is a blank disk, the disk is loaded into the information recording and reproducing apparatus whose recording function works properly but reproducing function does not work properly. In such a case, although the test data has been recorded in the test area, the test data cannot be reproduced. It is therefore recognized that the recording nor reproducing operations cannot be carried out on and from the disk, and thus the distinctive information indicating a blank disk is not recorded. Thereafter, the magneto-optical disk 1 is loaded into another information recording and reproducing apparatus. Here, from the fact that the reproduced test data does not coincide with the recorded test data, it can be assumed that the recording function of the apparatus does not work properly but the reproducing function works properly.

As aforementioned, whether or not the loaded magneto-optical disk 1 is a blank disk can be promptly and accurately determined using a self-checking function of the apparatus in the present embodiment. Further, when the magneto-optical disk 1 is recognized as a blank disk, the distinctive information indicating a blank disk is recorded in the TOC area 1a of the magneto-optical disk 1 as in the case of the previously discussed embodiment. As a result, whether or not the disk is a blank disk can be promptly and accurately determined. Further, in the case where the recording and/or reproducing function of the apparatus does not work properly, the recording operation is inhibited. Therefore, the possibility of destroying the useful main information which has been already recorded on the magneto-optical disk 1 is eliminated.

Next, another embodiment will be discussed regarding a process control after loading a disk with the information recording and reproducing apparatus of FIG. 9 referring to a flow chart shown in FIG. 8.

When loading the magneto optical disk 1 into the information recording and reproducing apparatus (S 41), first, test data is generated for a test recording (S 42). Here, the test data is generated by the controller 9 based on a predetermined sub-code information. Here, as in the case of the embodiment previously discussed referring to FIG. 7, the test data can be generated, for example, by a random number generator at each time or based on information indicating generation date or time of the test data. Further, in order to more accurately determine whether or not the recording function of the apparatus works properly, the test data is preferably designed so as not to be analogous to the previously recorded test data.

After generating the test data, the test data is recorded in a test area on the magneto-optical disk 1, i.e., a predetermined portion of the TOC area 1a or the main information recording area (S 43).

Next, an attempt is made to reproduce the test data, and if the test data can be reproduced, it is sent to the controller 9 (S 44). Then, it is checked whether or not the reproducing operation of the test data can be performed properly by the controller 9 (S 45). If so, it is checked further whether or not the reproduced test data coincides with actually recorded test data (S 46). If both test data coincide, it is determined that both the recording and reproducing functions of the apparatus work properly. Next, an attempt is made to reproduce the control information from the TOC area 1a (S 47).

Then, it is checked whether or not the reproducing operation of the control information can be carried out (S 48). If not, the magneto-optical disk 1 is determined to be a blank disk, thus the distinctive information indicating a blank disk is recorded in the TOC area 1a (S 49). In the mean time, a message indicating a blank disk is shown, for example, on a display (S 50). Thus, the sequence is set in standby for a normal recording operation (S 51). These steps are carried out when satisfying the following two conditions: Both the recording and reproducing functions of the information recording and reproducing apparatus work properly. The loaded magneto-optical disk 1 is a blank disk.

On the other hand, it is determined in S 48 that the reproducing operation of the control information can be carried out, the sequence is set in standby for a normal recording or reproducing operation of the main information (S 52). The above-mentioned steps are carried out when satisfying the following two conditions: The magneto-optical disk 1 stores both the main information and the control information. Both recording and reproducing functions of the information recording and reproducing apparatus works properly.

On the other hand, when the test data cannot be reproduced in S 45, or the test data can be reproduced but the obtained test data does not coincide with the recorded test data in S 46, an attempt is made to reproduce the control information from the TOC area 1a (S 53). Then, it is checked whether or not the reproducing operation of the control information can be carried out from the TOC area 1a (S 54). If not, a message is shown, for example, on a display (not shown) indicating "inhibit recording/reproducing" (S 55). Here, the magneto-optical disk 1 may be ejected if necessary (S 56). Then, the sequence is terminated (S 57).

On the other hand, when the reproducing operation of the control information can be carried out from the TOC area 1a in S 54, a message is shown, for example, on a display (not shown) indicating "inhibit recording" (S 58). Then, the sequence is set in standby for a normal reproducing operation (S 59). These steps are carried out when satisfying the following two conditions: The magneto-optical disk 1 stores both the main information and the control information. The recording function of the apparatus does not work properly but the reproducing function works properly.

As aforementioned, in the present embodiment, whether or not the loaded disk is a blank disk is promptly and accurately determined by self-checking means. When the magneto-optical disk 1 is determined to be a blank disk, the distinctive information is recorded in the TOC area of the magneto-optical disk 1. As a result, whether or not the disk is a blank disk can be promptly and accurately determined. Further, in the case where the recording and/or reproducing function does not work properly, the recording operation is inhibited. As a result, the possibility of destroying the useful main information which has been already recorded is eliminated.

In the present embodiment, the information recording and reproducing apparatus designed for audio information is employed; however, other types of information recording and reproducing apparatuses may be used as well such as those designed for computer-use data. As to a signal format, it should be understood that the present invention is not intended to be limited to the signal format for CDs shown in FIGS. 11 and 12.

Further, a display is used as an example of a means for displaying a message, however, in the case of computer-use data, the massage is preferably sent as a status from the information recording and reproducing apparatus to a host device connected thereto.

In the above embodiment, the magneto-optical disk 1 is employed as a recording medium. However, other re-writable type recording media such as phase-change type recording media may be employed as well.

While preferred embodiments has been described using the disc-shaped recording media, card-shaped or tape-shaped ones may be used as well, as long as they do not depart from the scope of the present invention.

As aforementioned, the information recording and reproducing apparatus in accordance with the present invention is arranged so as to include: reproduction means for reproducing the control information from the control information recording area upon loading the recording medium; self-checking means for checking whether or not the recording and reproducing functions of the apparatus work properly; recording means for recording in the control information recording area distinctive information indicating no piece of main information exists in the main information recording area of the recording medium when the reproducing operation of the control information cannot be performed by the reproduction means, and it is detected by the self-checking means that both the recording and reproducing functions of the apparatus work properly; and inhibit means for inhibiting a recording operation in the main information recording area when a reproducing operation cannot be performed from the control information recording area by the reproduction means, and it is detected by the self-checking means that the reproducing function of the apparatus does not work properly.

With this arrangement, if the reproducing operation cannot be performed from the control information recording area upon loading the recording medium into the apparatus, the causes this happens will be the following two: The recording medium is a blank disk storing no control information. The reproducing function of the apparatus does not work properly. Here, the self-checking means determines whether or not the recording function of the apparatus works properly. Base on the result of this determination, whether or not the recording medium is a blank medium is accurately determined upon loading the recording medium.

When it is determined that the recording medium is a blank medium, the distinctive information indicating a blank medium is recorded in the control information recording medium. Thereafter, the recording medium is promptly determined to be a blank medium upon loading a recording medium by reproducing the distinctive information from the control information recording area.

Further, in the case where the reproducing operation of the control information cannot be performed, and it is detected by the self-checking means that the recording or reproducing function of the apparatus does not work properly, at least the recording operation is inhibited, thereby eliminating a possibility of destroying the useful main information already recorded in the main information recording area.

The present invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. An information recording and reproducing apparatus for recording and reproducing on and from a recording medium including a main information recording area wherein plural pieces of main information can be recorded and a control information recording area wherein control information related to each piece of main information in the main information recording area can be recorded, comprising:
   blank medium detection means for detecting whether or not any pieces of main information exist in the main information recording area of a loaded recording medium; and
   recording means for recording in the control information recording area distinctive information indicating no piece of main information in the main information recording area of the loaded recording medium when it is detected by said blank medium detection means that no piece of main information exists in the main information recording area of the loaded recording medium.

2. The information recording and reproducing apparatus as set forth in claim 1, wherein:
   said blank medium detection means includes control information detection means for detecting whether or not any pieces of control information exist in the control information recording area.

3. An information recording and reproducing apparatus for recording and reproducing on and from a recording medium including a main information recording area wherein plural pieces of main information can be recorded and a control information recording area wherein control information related to each piece of main information in the main information recording area can be recorded, comprising:
   reproduction means for reproducing the control information from the control information recording area upon loading the recording medium;
   control information detection means for detecting whether or not any pieces of control information exist in the control information recording area upon reproducing from the control information recording area; and
   inhibit means for inhibiting a recording operation in the main information recording area when a reproducing operation of the control information cannot be performed by said reproduction means, and it is detected by said control information detection means that the control information exists in the control information recording area.

4. The information recording and reproducing apparatus as set forth in claim 2, wherein:
   said control information detection means includes amplitude detection means for detecting an amplitude of a reproduced analog signal from the control information recording area.

5. The information recording and reproducing apparatus as set forth in claim 4, wherein:
   said amplitude detection means includes peak holding means for holding a maximum value of the reproduced analog signal with a predetermined time constant.

6. The information recording and reproducing apparatus as set forth in claim 4, wherein said amplitude detection means includes:
   positive peak holding means for holding a positive maximum value of the reproduced analog signal with a predetermined time constant;
   negative peak holding means for holding a negative maximum value of the reproduced analog signal with a predetermined time constant; and
   subtraction means for obtaining an amplitude of the reproduced analog signal by subtracting a hold value of said negative peak holding means from a hold value of said positive peak holding means.

7. The information recording and reproducing apparatus as set forth in claim 6, further comprising:
   low pass filtering means for smoothing a signal outputted from said subtraction means by attenuating a high frequency band of the signal; and
   digitization means for digitizing a signal outputted from said low pass filtering means.

8. An information recording and reproducing apparatus for recording and reproducing on and from a recording medium including a main information recording area wherein plural pieces of main information can be recorded and a control information recording area wherein control information related to each piece of main information in the main information recording area can be recorded, comprising:
   reproduction means for reproducing the control information from the control information recording area upon loading the recording medium;
   control information detection means for detecting whether or not any pieces of control information exist in the control information recording area upon reproducing from the control information recording area; and
   recording means for recording in the control information recording area distinctive information indicating no piece of main information in the main information recording area of the loaded recording medium when no piece of control information exists in the control information recording area of the loaded recording medium.

9. The information recording and reproducing apparatus as set forth in claim 8, further comprising:
   inhibit means for inhibiting a recording operation in the main information recording area when a reproducing operation of the control information cannot be performed by said reproduction means, and it is detected by said control information detection means that the control information exist in the control information recording area.

10. The information recording and reproducing apparatus as set forth in claim 1, wherein said blank medium detection means includes:
reproduction means for reproducing the control information from the control information recording area upon loading the recording medium;
self-checking means for checking whether or not a reproducing function of the apparatus works properly; and
means for determining that no piece of main information exists in the main information recording area of the loaded recording medium when a reproducing operation of the control information cannot be performed by said reproduction means, and it is detected by said self-checking means that the reproducing function of the apparatus works properly.

11. The information recording and reproducing apparatus as set forth in claim 10, wherein said self-checking means includes:
test writing means for recording test data in a test area of the recording medium;
test data reproduction means for reproducing the test data from the test area after a recording operation is performed by said test writing means; and
means for determining that the reproducing function works properly when a reproducing operation of the test data can be performed from the test area by said test data reproduction means.

12. An information recording and reproducing apparatus for recording and reproducing on and from a recording medium including a main information recording area wherein plural pieces of main information can be recorded and a control information recording area wherein control information related to each piece of main information in the main information recording area can be recorded, comprising:
reproduction means for reproducing the control information from the control information recording area upon loading the recording medium;
self-checking means for checking whether or not a reproducing function of the apparatus works properly; and
inhibit means for inhibiting a recording operation in the main information recording area when a reproducing operation of the control information cannot be performed by said reproduction means, and it is detected by said self-checking means that the reproducing function of the apparatus does not work properly.

13. An information recording and reproducing apparatus for recording and reproducing on and from a recording medium including a main information recording area wherein plural pieces of main information can be recorded and a control information recording area wherein control information related to each piece of main information in the main information recording area can be recorded, comprising:
reproduction means for reproducing the control information from the control information recording area upon loading the recording medium;
self-checking means for checking whether or not both recording and reproducing functions of the apparatus work properly; and
recording means for recording distinctive information indicating no piece of main information exists in the main information recording area of the recording medium when a reproducing operation of the control information cannot be performed by said reproduction means, and it is detected by said self-checking means that both the recording and reproducing functions of the apparatus work properly.

14. The information recording and reproducing apparatus as set forth in claim 13, further comprising:
inhibit means for inhibiting a recording operation in the main information recording area when the reproducing operation of the control information cannot be performed by said reproduction means, and it is detected by said self-checking means that the recording or reproducing function of the apparatus does not work properly.

15. The information recording and reproducing apparatus as set forth in claim 13, wherein said self-checking means includes:
test writing means for recording test data in a test area of the recording medium;
test data reproduction means for reproducing the test data from the test area after a recording operation is performed by said test writing means; and
judging means for determining whether or not the test data reproduced by said test data reproduction means coincides with the test data recorded by said test writing means.

16. The information recording and reproducing apparatus as set forth in claim 1, wherein:
the distinctive information is recorded at a starting position of a reproducing operation from the control information recording area.

17. The information recording and reproducing apparatus as set forth in claim 15, wherein:
the test data is generated by random number generation means.

18. The information recording and reproducing apparatus as set forth in claim 15, wherein:
the test data is generated based on information indicating generation date or time of the test data.

19. A method for detecting whether or not a recording medium is a blank medium, which includes a main information recording area wherein plural pieces of main information can be recorded and a control information recording area wherein control information related to each piece of main information in the main information recording area can be recorded, comprising the steps of:
checking whether or not any pieces of control information exist in the control information recording area; and
determining that the recording medium is a blank medium when it is detected that no piece of control information exists in the control information recording area.

20. A method for detecting whether or not a recording medium is a blank medium, which includes a main information recording area wherein plural pieces of main information can be recorded and a control information recording area wherein control information related to each piece of main information in the main information recording area can be recorded, comprising the steps of:
(a) reproducing the control information from the control information recording area;

(b) checking whether or not a reproducing operation of the control information can be performed;
(c) checking whether or not a reproducing function of an information recording and reproducing apparatus employing the recording medium works properly; and
(d) determining that the recording medium is a blank medium when it is determined that the reproducing operation cannot be performed in the step (b) and that the reproducing function of the apparatus works properly in the step (c).

21. The method as set forth in claim 20, for detecting whether or not a recording medium is a blank medium, which includes a main information recording area wherein plural pieces of main information can be recorded and a control information recording area wherein control information related to each piece of main information in the main information recording area can be recorded, wherein the step (c) includes the processes of:
(e) recording test data in a test area of the recording medium;
(f) reproducing the test data from the test area after carrying out the step (e); and
(g) checking whether or not the test data reproduced in the step (f) coincides with the test data recorded in the step (e).

* * * * *